(12) United States Patent
Matsumoto et al.

(10) Patent No.: US 12,109,959 B2
(45) Date of Patent: Oct. 8, 2024

(54) POWER SUPPLY DEVICE AND METHOD THAT DETERMINE LOCATION OF FAULT IN FIRST AND SECOND POWER SUPPLY SYSTEMS

(71) Applicant: DENSO TEN Limited, Kobe (JP)

(72) Inventors: Takeshi Matsumoto, Kobe (JP); Daiki Hakushima, Kobe (JP); Keiichi Yonezaki, Kobe (JP)

(73) Assignee: DENSO TEN Limited, Kobe (JP)

( * ) Notice: Subject to any disclaimer, the term of this patent is extended or adjusted under 35 U.S.C. 154(b) by 474 days.

(21) Appl. No.: 17/487,762

(22) Filed: Sep. 28, 2021

(65) Prior Publication Data

US 2022/0306020 A1    Sep. 29, 2022

(30) Foreign Application Priority Data

Mar. 29, 2021 (JP) ................. 2021-055172

(51) Int. Cl.
| | |
|---|---|
| *B60R 16/033* | (2006.01) |
| *H02H 3/08* | (2006.01) |
| *H02H 3/16* | (2006.01) |
| *H02H 7/28* | (2006.01) |
| *H02J 7/14* | (2006.01) |

(52) U.S. Cl.
CPC ............ *B60R 16/033* (2013.01); *H02H 3/08* (2013.01); *H02H 3/16* (2013.01); *H02H 7/28* (2013.01); *H02J 7/1423* (2013.01)

(58) Field of Classification Search
CPC ..... Y02T 10/70; Y02T 10/72; Y02T 10/7072; B60L 3/0069; B60L 3/0092; B60L 3/04; H02M 1/32; H02H 3/16; H02H 3/167; H02H 3/08; H02H 9/02; H02H 9/08; H02H 7/26; H02H 7/266; H02H 7/267; H02H 7/268; H02H 7/28; H02J 7/031; H02J 1/086; H02J 9/068
See application file for complete search history.

(56) References Cited

U.S. PATENT DOCUMENTS

| | | | | |
|---|---|---|---|---|
| 9,705,319 | B2 * | 7/2017 | Morita | ............... H02J 1/06 |
| 2012/0182024 | A1 * | 7/2012 | Ike | ............... G01R 31/52 |
| | | | | 324/509 |
| 2013/0119933 | A1 * | 5/2013 | Flack | ............... B60L 3/0069 |
| | | | | 320/109 |

(Continued)

FOREIGN PATENT DOCUMENTS

JP    2019-062727 A    4/2019

*Primary Examiner* — Gustavo A Rosario-Benitez
(74) *Attorney, Agent, or Firm* — Oliff PLC

(57) ABSTRACT

A power supply device includes: a first system; a second system; an inter-system switch configured to be able to connect and disconnect between the first system and the second system; a determining unit configured to keep the inter-system switch in an ON state in a normal time, and turn off the inter-system switch and determine which system a ground fault has occurred in, if detecting a ground fault of the first system or the second system; and a suppression circuit configured to suppress an electric discharge of the second power supply and supply electric power for ground fault detection to the second system, and the determining unit determines whether any ground fault has occurred in the second system or not, based on the electric power which is supplied from the suppression circuit to the second system.

12 Claims, 12 Drawing Sheets

(56) References Cited

U.S. PATENT DOCUMENTS

| | | |
|---|---|---|
| 2018/0001850 A1* | 1/2018 | Kontani .................... H02J 1/08 |
| 2018/0224493 A1* | 8/2018 | Kawamura .......... G01R 31/382 |
| 2018/0354436 A1* | 12/2018 | Sato ....................... H02H 7/268 |
| 2019/0115175 A1* | 4/2019 | Saito .................... H01H 47/002 |
| 2019/0126866 A1* | 5/2019 | Sato ...................... H02J 7/0031 |
| 2020/0216002 A1* | 7/2020 | Mazaki ................. H02J 7/1423 |
| 2022/0063414 A1* | 3/2022 | Kim ..................... B60L 3/0084 |

* cited by examiner

POWER SUPPLY DEVICE AND METHOD THAT DETERMINE LOCATION OF FAULT IN FIRST AND SECOND POWER SUPPLY SYSTEMS

CROSS-REFERENCE TO RELATED APPLICATION

This application is based on and claims priority under 35 USC 119 from Japanese Patent Application No. 2021-055172 filed on Mar. 29, 2021.

TECHNICAL FIELD

Embodiments of this disclosure relate to a power supply device and a determining method.

BACKGROUND ART

Conventionally, there is a redundant power supply system which has a first power supply and a second power supply so as to supply electric power to on-board equipment (loads) for self-driving by one of power supply systems if a ground fault occurs in the other power supply system, such that even though a power supply fault occurs when the vehicle runs by self-driving, the redundant power supply system can make it possible for the vehicle to run for evacuating to a safe place and stop there.

The redundant power supply system has a first system which is connected to a first load for self-driving, a second system which is connected to a second load having the same function as the first load has, and an inter-system switch capable of connecting and disconnecting between the first system and the second system.

The redundant power supply system normally keeps the inter-system switch in the ON state to supply electric power from the first power supply to the first load and the second load. Further, if a power supply fault such as a ground fault occurs in the first system, the redundant power supply system performs backup control to turn off the inter-system switch such that electric power is supplied from the second power supply to the second load for running for evacuation.

In order to prevent the redundant power supply system from performing backup control using the second power supply when a ground fault occurs in the second system, if detecting a ground fault of the first system or the second system, the redundant power supply system needs to determine whether the detected ground fault is a ground fault of the second system or not.

For this reason, there is a power supply system which detects a ground fault of the first system or the second system and determines whether the detected ground fault is a ground fault of the second system or not by turning off the inter-system switch and supplying electric power from the second power supply to the second system (see Japanese Patent Application Laid-Open No. 2019-62727 for instance). When the voltage of the second system is lower than a normal voltage, the power supply system determines that it is a ground fault of the second system, and when the voltage of the second system is the normal voltage, the power supply system determines that it is not a ground fault of the second system.

SUMMARY OF INVENTION

However, in the technology of the conventional art, since the second power supply is discharged to determine whether the detected ground fault is a ground fault of the second system or not, the residual amount of electric power stored in the second power supply decreases, and the period of time when backup control for running for evacuation is possible shortens.

An aspect of embodiments was made in view of this circumstances, and an object thereof is to provide a power supply device and a determining method capable of determining whether a ground fault is a ground fault of a second system or not while suppressing the electric discharge of a second power supply.

A power supply device according to an aspect of embodiments includes a first system, a second system, an inter-system switch, a determining unit, and a suppression circuit. The first system supplies electric power of a first power supply to a first load. The second system supplies electric power of a second power supply to a second load. The inter-system switch can connect and disconnect between the first system and the second system. The determining unit keeps the inter-system switch in an ON state in normal time, and turns off the inter-system switch and determines which system a ground fault has occurred in, if detecting a ground fault of the first system or the second system. The suppression circuit suppresses the electric discharge of the second power supply and supplies electric power for ground fault detection to the second system. The determining unit determines whether any ground fault has occurred in the second system or not, on the basis of the electric power which is supplied from the suppression circuit to the second system.

The power supply device and the determining method according to the aspect of embodiments have the effect of being able to determine whether a ground fault is a ground fault of the second system or not while suppressing the electric discharge of the second power supply.

DETAILED DESCRIPTION OF THE INVENTION

Hereinafter, embodiments of a power supply device and a determining method will be described in detail with reference to the accompanying drawings. However, the present invention is not limited by the following embodiments. Hereinafter, power supply devices which are mounted on vehicles having a self-driving function in order to supply electric power to loads will be described as examples; however, the power devices according to the embodiments can also be mounted on vehicles having no self-driving function.

Further, hereinafter, the cases where the vehicles on which the power devices are mounted are hybrid automobiles will be described; however, vehicles on which the power devices can be mounted may be engine automobiles which run by internal combustion engines.

1. FIRST EMBODIMENT

1-1. Configuration of Power Supply Device

Figure 1:
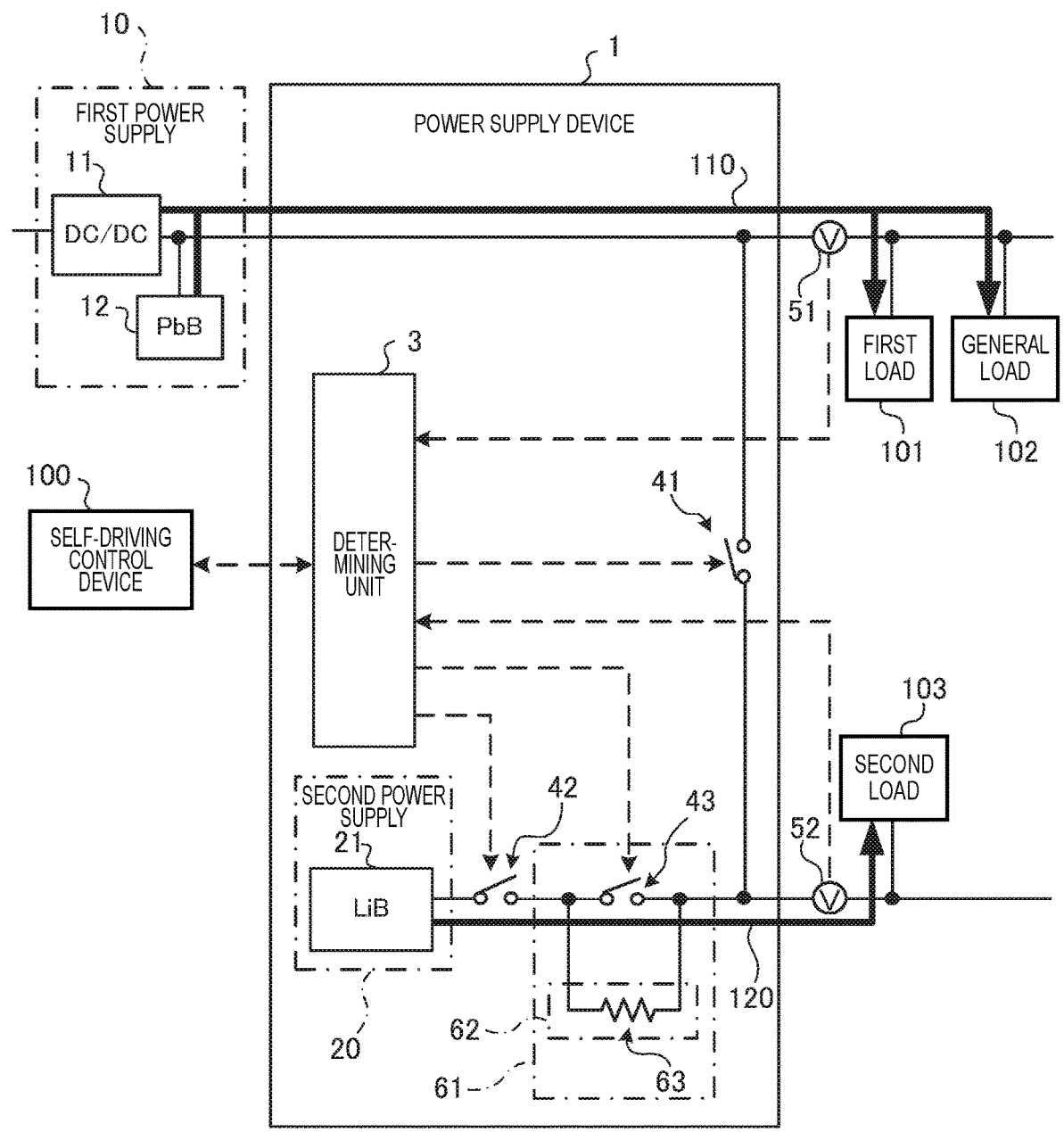
FIG. 1 is an explanatory view illustrating a configuration example of a power supply device according to a first embodiment.

FIG. 1 is an explanatory view illustrating a configuration example of a power supply device according to a first embodiment. As shown in FIG. 1, a power supply device 1 according to the first embodiment is connected to a first power supply 10, a first load 101, a general load 102, a second load 103, and a self-driving control device 100. The power supply device 1 includes a first system 110 for supplying electric power of the first power supply 10 to the first load 101 and the general load 102, and a second system 120 for supplying electric power of a second power supply 20 (to be described below) to the second load 103.

The first load 101 includes loads for self-driving. For example, the first load 101 includes a steering motor, an electric brake device, onboard cameras, radars, and so on which operate during self-driving. The general load 102 includes, for example, a display, an air conditioner, an audio system, a video system, various lights, and so on.

The second load 103 has the same function as the first load has. The second load 103 includes devices which operate during self-driving, such as a steering motor, an electric brake device, onboard cameras, and radars. The first load 101, the general load 102, and the second load 103 are operated by electric power supplied from the power supply device 1. The self-driving control device 100 is a device for performing self-driving control on the vehicle by operating the first load 101 or the second load 103.

The first power supply 10 includes a DC-to-DC converter (hereinafter, referred to as the "DC/DC 11"), and a lead battery (hereinafter, referred to as the "PbB 12"). However, a battery for the first power supply 10 may be an arbitrary secondary battery other than the PbB 12.

The DC/DC 11 is connected to a power generator, and a high-voltage battery having a voltage higher than that of the PbB 12, and drops the voltages of the power generator and the high-voltage battery and outputs them to the first system 110. The power generator is, for example, an alternator for generating electric power by converting the kinetic energy of a running vehicle into electricity. The high-voltage battery is, for example, a vehicle driving battery which can be mounted on electric automobiles or hybrid automobiles.

By the way, in the case where the first power supply 10 is mounted on an engine automobile, an alternator (a power generator) can be provided instead of the DC/DC 11. The DC/DC 11 performs charging the PbB 12, supply of electric power to the first load 101 and the general load 102, supply of electric power to the second load 103, and charging the second power supply 20 (to be described below).

The power supply device 1 includes the second power supply 20, an inter-system switch 41, a battery switch 42, a determining unit 3, a suppression circuit 61, and voltage sensors 51 and 52.

The second power supply 20 is a backup power supply for the case where supply of electric power by the first power supply 10 becomes impossible. The second power supply 20 includes a lithium-ion battery (hereinafter, referred to as the "LiB 21"). However, a battery for the second power supply 20 may be an arbitrary secondary battery other than the LiB 21.

The inter-system switch 41 is a switch capable of connecting and disconnecting between the first system 110 and the second system 120. The battery switch 42 is a switch capable of connecting and disconnecting between the LiB 21 and the suppression circuit 61.

The suppression circuit 61 is a circuit for suppressing the electric discharge of the second power supply 20 and supplying electric power for ground fault determination to the second system 120. The suppression circuit 61 is connected between the battery switch 42 and the second load 103. The suppression circuit 61 includes a backup switch 43 and a current limiting circuit 62.

The backup switch 43 is a switch capable of connecting and disconnecting between the battery switch 42 and the second load 103. The current limiting circuit 62 is a circuit for limiting the electric current output from the second power supply 20 and supplying electric power to the second system 120. The current limiting circuit 62 is connected in parallel to the backup switch 43. The current limiting circuit 62 is, for example, a resistor 63.

However, the current limiting circuit 62 is not limited to the resistor 63. The current limiting circuit 62 may be any other circuit element as long as it can limit the electric current output from the second power supply 20. For example, the current limiting circuit 62 may be a plurality of diodes connected in series.

The voltage sensor 51 is connected between the first power supply 10 and the first load 101. The voltage sensor 51 detects the voltage of the first system 110, and outputs the detection result to the determining unit 3. The voltage sensor 52 is connected between the suppression circuit 61 and the second load 103. The voltage sensor 52 detects the voltage of the second system 120, and outputs the detection result to the determining unit 3.

The determining unit 3 includes a microcomputer having a central processing unit (CPU), a read only memory (ROM), a random access memory (RAM), and so on, and various circuits. However, the determining unit 3 may be configured with hardware such as application specific integrated circuit (ASIC) and a field programmable gate array (FPGA).

The CPU executes programs stored in the ROM, using the RAM as a work area, whereby the determining unit 3 controls the operation of the power supply device 1. The determining unit 3 determines a ground fault of the first system 110 or the second system 120, on the basis of the detection results input from the voltage sensors 51 and 52, and controls the ON/OFF states of the inter-system switch 41, the battery switch 42, and the backup switch 43.

The determining unit 3 controls the ON/OFF states of the inter-system switch 41, the battery switch 42, and the backup switch 43 to supply electric power from the first power supply 10 or the second power supply 20 to the first load 101, the general load 102, and the second load 103. The power supply operation of the power supply device 1 will be described below with reference to FIG. 2 to FIG. 5.

Further, the determining unit 3 charges the LiB 21 with electric power supplied from the first power supply 10 if the voltage of the LiB 21 drops. For example, when the voltage of the LiB 21 which is detected by a voltage sensor (not shown in the drawings) becomes equal to or lower than a charging threshold, the determining unit 3 turns on the inter-system switch 41, the battery switch 42, and the backup switch 43. As a result, the LiB 21 is charged with electric power supplied from the first power supply 10.

If a power supply fault such as a ground fault occurs in one system of the first system 110 and the second system 120, the determining unit 3 supplies electric power to the loads by the other system. Therefore, even though a ground fault occurs in any one system during self-driving, the power supply device 1 uses the other system to make it possible for the self-driving control device 100 to drive the vehicle to a safe place for evacuation and stop the vehicle.

Now, the operation of the power supply device 1 will be described with reference to FIG. 2 to FIG. 5. In FIG. 2 to FIG. 5, in order to facilitate understanding of the operation of the power supply device 1, the determining unit 3, the self-driving control device 100, and the control signal lines shown by the dashed arrows in FIG. 1 are not shown.

1-2. NORMAL OPERATION OF POWER SUPPLY DEVICE

Figure 2:
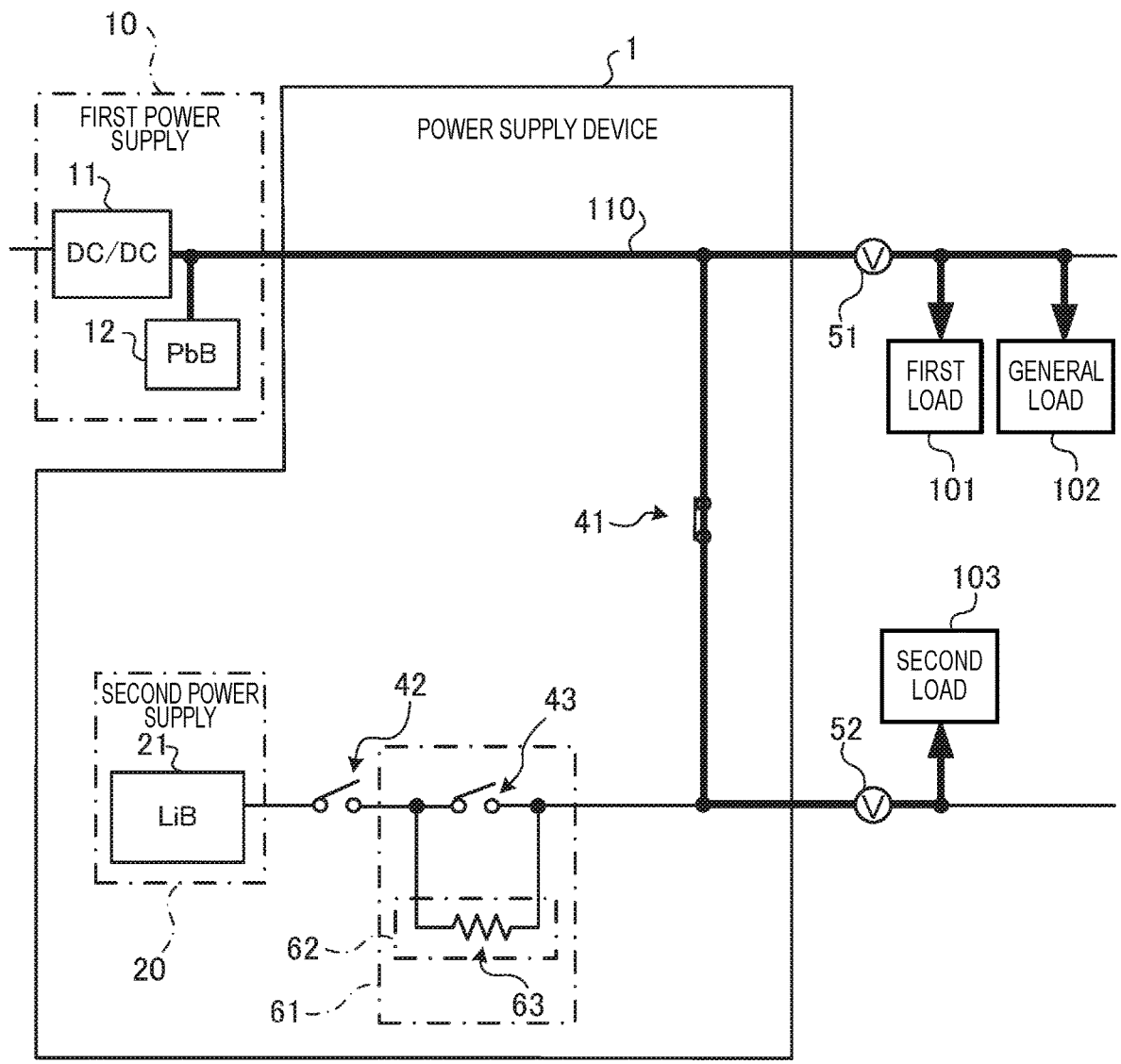
FIG. 2 is an explanatory view illustrating an operation example of the power supply device according to the first embodiment.

In normal time when there is no ground fault in the first system 110 and the second system 120, the determining unit 3 turns on the inter-system switch 41, and turns off the battery switch 42, and turns off the backup switch 43, as shown in FIG. 2, to supply electric power from the first power supply 10 to the first load 101, the general load 102, and the second load 103.

1-3. GROUND FAULT SYSTEM DETERMINING OPERATION OF POWER SUPPLY DEVICE

Figure 3:
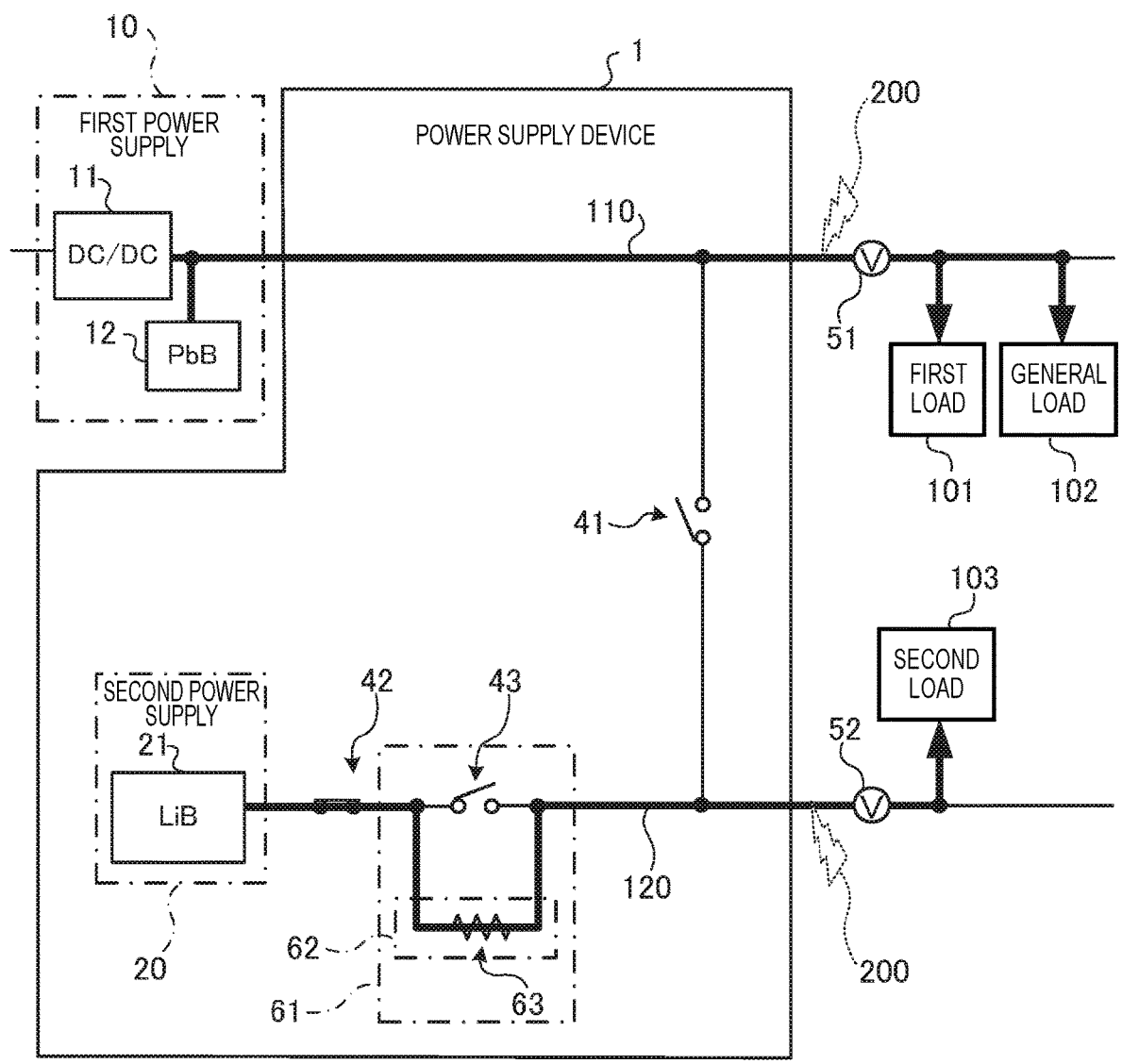
FIG. 3 is an explanatory view illustrating another operation example of the power supply device according to the first embodiment.

In the power supply device 1, if a ground fault 200 occurs in the first system 110 or the second system 120 during the normal operation shown in FIG. 2, an electric discharge from the first power supply 10 and the second power supply 20 to the ground fault point occurs. For this reason, as shown in FIG. 3, if detecting a ground fault of the first system 110 or the second system 120, the determining unit 3 turns off the inter-system switch 41 to prevent the electric discharge from the power supply in which the ground fault 200 has not occurred to the ground fault point.

Specifically, if at least one voltage of the voltages which are detected by the voltage sensors 51 and 52 becomes equal to or lower than a ground fault threshold due to occurrence of a ground fault 200, the determining unit 3 determines that a ground fault 200 has occurred in the first system 110 or the second system 120, and turns off the inter-system switch 41.

By the way, the power supply device 1 may have a configuration having current sensors in place of the voltage sensors 51 and 52. In this case, if the electric currents which are detected by the current sensors become equal to or lower than a ground fault threshold, the determining unit 3 determines that a ground fault 200 has occurred in the first system 110 or the second system 120, and turns off the inter-system switch 41.

Subsequently, the determining unit 3 determines which system of the first system 110 and the second system 120 the ground fault 200 has occurred in. At this time, in the case where any ground fault 200 has not occurred in the first system 110, and the ground fault 200 has occurred in the second system 120, after the inter-system switch 41 is turned off, electric power is supplied from the first power supply 10 to the first load 101, but any electric power is not supplied from the second power supply 20 to the second load 103.

For this reason, after the inter-system switch 41 is turned off, if the voltage which is detected by the voltage sensor 51 returns to the voltage higher than the ground fault threshold within a predetermined time T for abnormality determination, the determining unit 3 determines that there is no ground fault 200 in the first system 110. Further, if the voltage which is detected by the voltage sensor 51 is equal to or lower than the ground fault threshold continuously for the predetermined time T, the determining unit 3 determines that there is a ground fault 200 in the first system 110, and determines that an abnormality has occurred in the first system 110.

Similarly, after the inter-system switch 41 is turned off, for example, when the second power supply 20 and the second load 103 are connected directly, if the voltage which is detected by the voltage sensor 52 returns to the voltage higher than the ground fault threshold within the predetermined time T, the determining unit 3 can determine that there is no ground fault 200 in the second system 120. Further, if the voltage which is detected by the voltage sensor 52 is equal to or lower than the ground fault threshold continuously for the predetermined time T, the determining unit 3 can determine that there is a ground fault 200 in the second system 120.

However, when the second power supply 20 and the second load 103 are connected directly to discharge the second power supply 20 in order to determine whether the it is a ground fault 200 of the second system 120 or not, part of the electric power stored in the second power supply 20 is consumed to perform the determination, whereby the residual amount of electric power stored in the second power supply 20 decreases, and the period of time when backup control for running for evacuation is possible shortens.

For this reason, the power supply device 1 includes the suppression circuit 61 for suppressing the electric discharge of the second power supply 20 and supplying electric power for ground fault determination to the second system 120. Further, the determining unit 3 determines whether a ground fault 200 has occurred in the second system 120, on the basis of the electric power which is supplied from the suppression circuit 61 to the second system 120. Therefore, the power supply device 1 can determine whether it is a ground fault 200 of the second system 120 or not while suppressing the electric discharge of the second power supply 20.

Specifically, if detecting a ground fault 200 of the first system 110 or the second system 120, the determining unit 3 turns off the inter-system switch 41, and turns on the battery switch 42, as shown in FIG. 3. At this time, the backup switch 43 is in the OFF state.

Further, the determining unit 3 determines whether a ground fault 200 has occurred in the second system 120, on the basis of the electric power which is supplied from the current limiting circuit 62 to the second system 120. At this time, if there is no ground fault 200 in the second system 120, the electric power output from the second power supply 20 passes through the battery switch 42 and the resistor 63 such that the electric current is limited, and then the electric power from the second power supply 20 is supplied to the second load 103.

As a result, the voltage which is detected by the voltage sensor 52 becomes higher than the ground fault threshold. In contrast with this, if there is a ground fault 200 in the second system 120, even though the battery switch 42 is turned on, electric current flows from the second power supply 20 to the ground fault point, whereby the voltage which is detected by the voltage sensor 52 becomes equal to or lower than the ground fault threshold.

For this reason, after the inter-system switch 41 is turned off, and the battery switch 42 is turned on, if the voltage which is detected by the voltage sensor 52 is lower than the ground fault threshold continuously for the predetermined time T, the determining unit 3 determines that there is a ground fault 200 in the second system 120, and determines that an abnormality has occurred in the second system 120. If the voltage which is detected by the voltage sensor 52 returns to the voltage equal to or higher than the ground fault threshold within the predetermined time T, the determining unit determines that there is no ground fault in the second system 120.

If determining that any ground fault has not occurred in either of the first system 110 and the second system 120, the determining unit 3 determines that it was a detection error caused by temporal overload, noise, or the like attributable to the first load 101, the second load 103, and so on, and turns on the inter-system switch 41, and then turns off the battery switch 42, thereby restoring the power supply device to the normal state.

As described above, the power supply device 1 supplies the electric power for ground fault detection obtained by limiting the electric current output from the second power supply 20 by the current limiting circuit 62, to the second system 120, thereby determining whether there is a ground fault 200 in the second system 120. Therefore, the power supply device 1 can determine whether a ground fault is a ground fault 200 of the second system 120 while suppressing the amount of electric discharge of the second power supply 20 to the minimum necessary.

1-4. OPERATION OF POWER SUPPLY DEVICE DURING FIRST-SYSTEM GROUND FAULT

Figure 4:
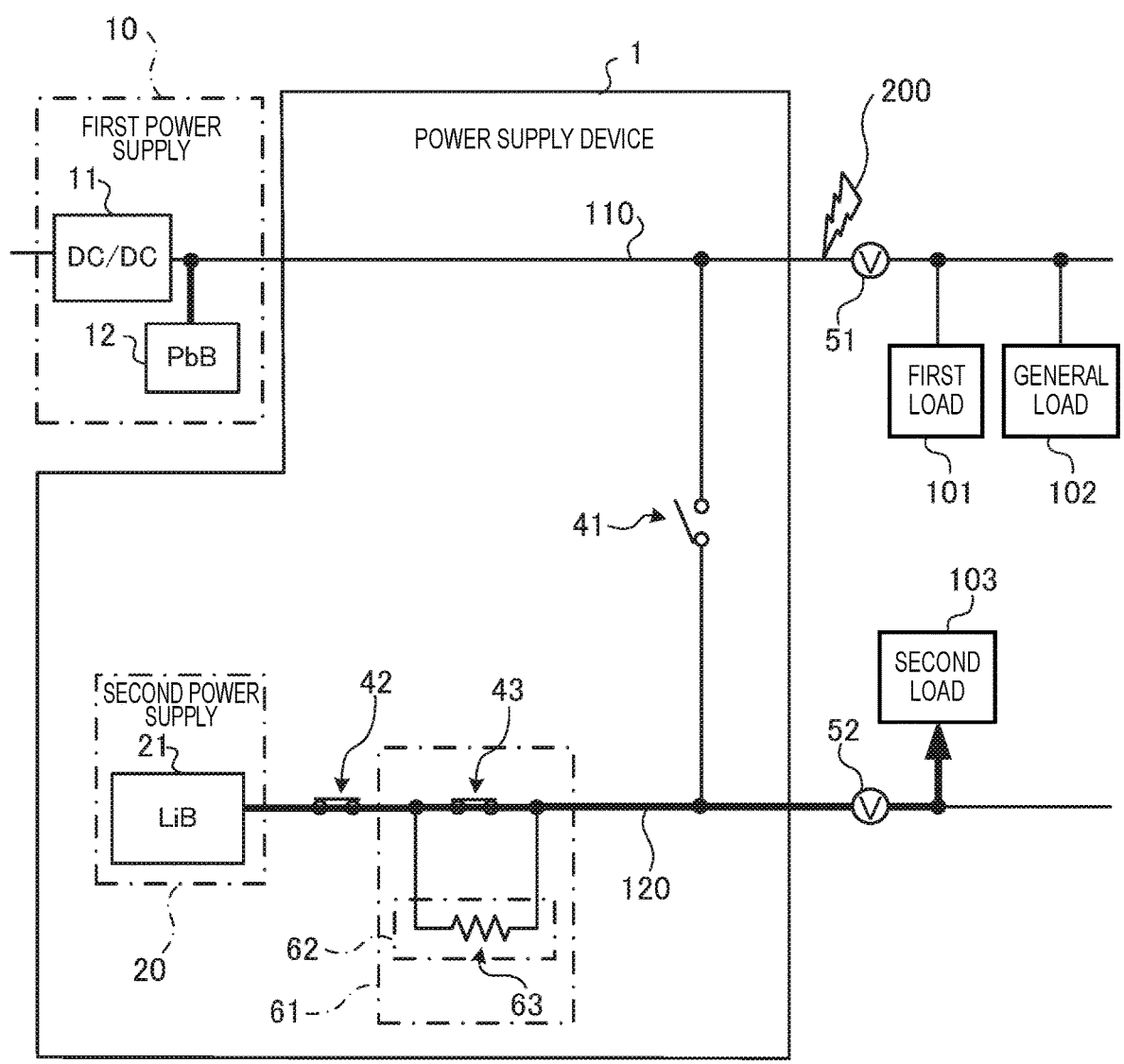
FIG. 4 is an explanatory view illustrating a further operation example of the power supply device according to the first embodiment.

Now, the operation of the power supply device 1 during first-system ground fault will be described with reference to FIG. 4. As shown in FIG. 4, if detecting a ground fault 200 of the first system 110 and determining an abnormality, the determining unit 3 turns on the backup switch 43 from the state shown in FIG. 3.

As a result, the power supply device 1 supplies electric power from the second power supply 20 to the second load 103 through the battery switch 42 and the backup switch 43, such that the second load 103 can make the vehicle run for evacuation.

As described above, if detecting and determining a ground fault 200 of the first system 110, the power supply device 1 supplies electric power from the second power supply 20 directly to the second load 103, without performing electric current limiting by the current limiting circuit 62. Therefore, it is possible to supply necessary and sufficient electric power to the second load 103.

1-5. OPERATION OF POWER SUPPLY DEVICE DURING SECOND-SYSTEM GROUND FAULT

Figure 5:
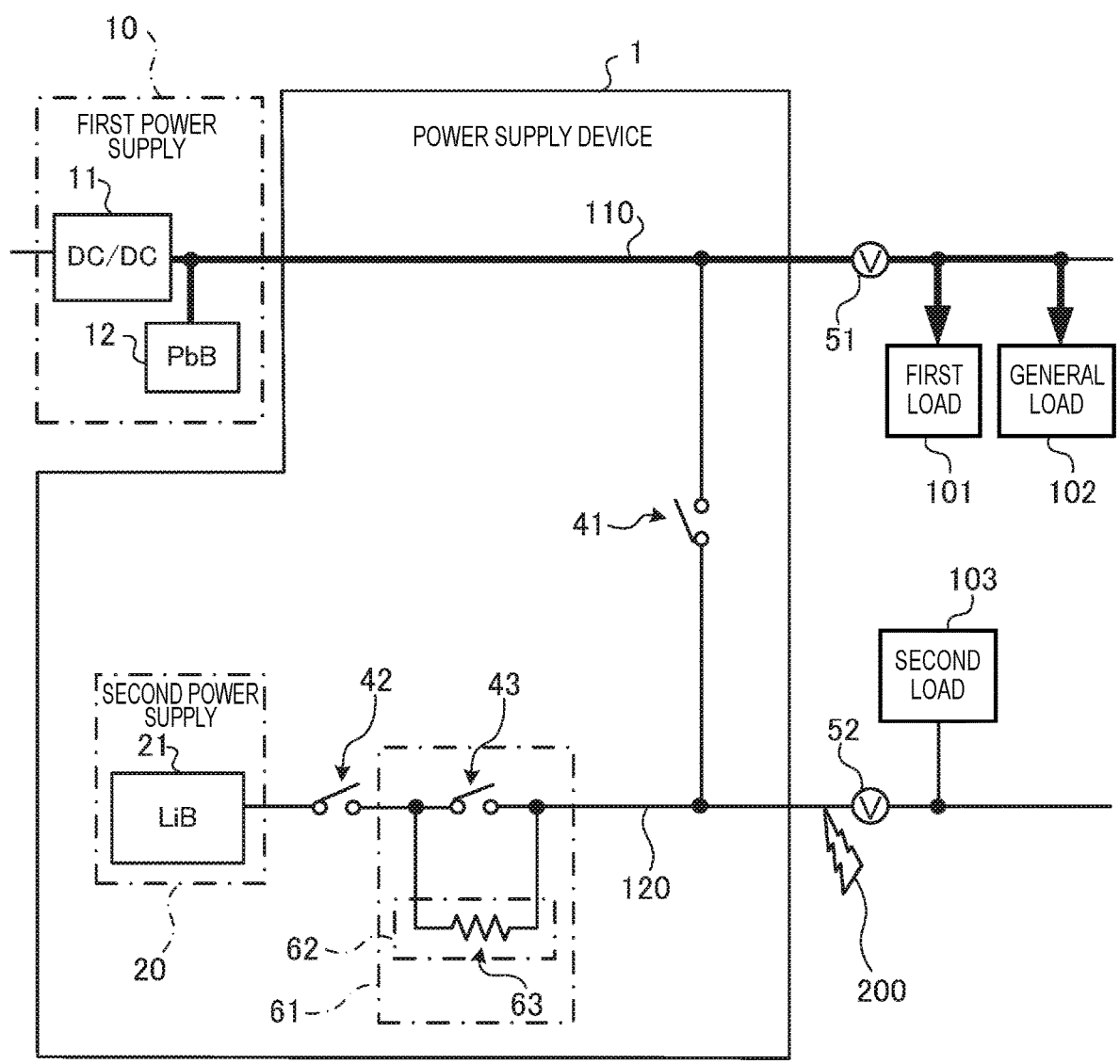
FIG. 5 is an explanatory view illustrating a still further operation example of the power supply device according to the first embodiment.

Now, the operation of the power supply device 1 during second-system ground fault will be described with reference to FIG. 5. As shown in FIG. 5, if detecting a ground fault 200 of the second system 120 and determining an abnormality, the determining unit 3 supplies electric power from the first power supply 10 to the first load 101, such that the first load 101 can make the vehicle run for evacuation.

1-6. PROCESSING WHICH IS PERFORMED BY DETERMINING UNIT OF POWER SUPPLY DEVICE

Figure 6:
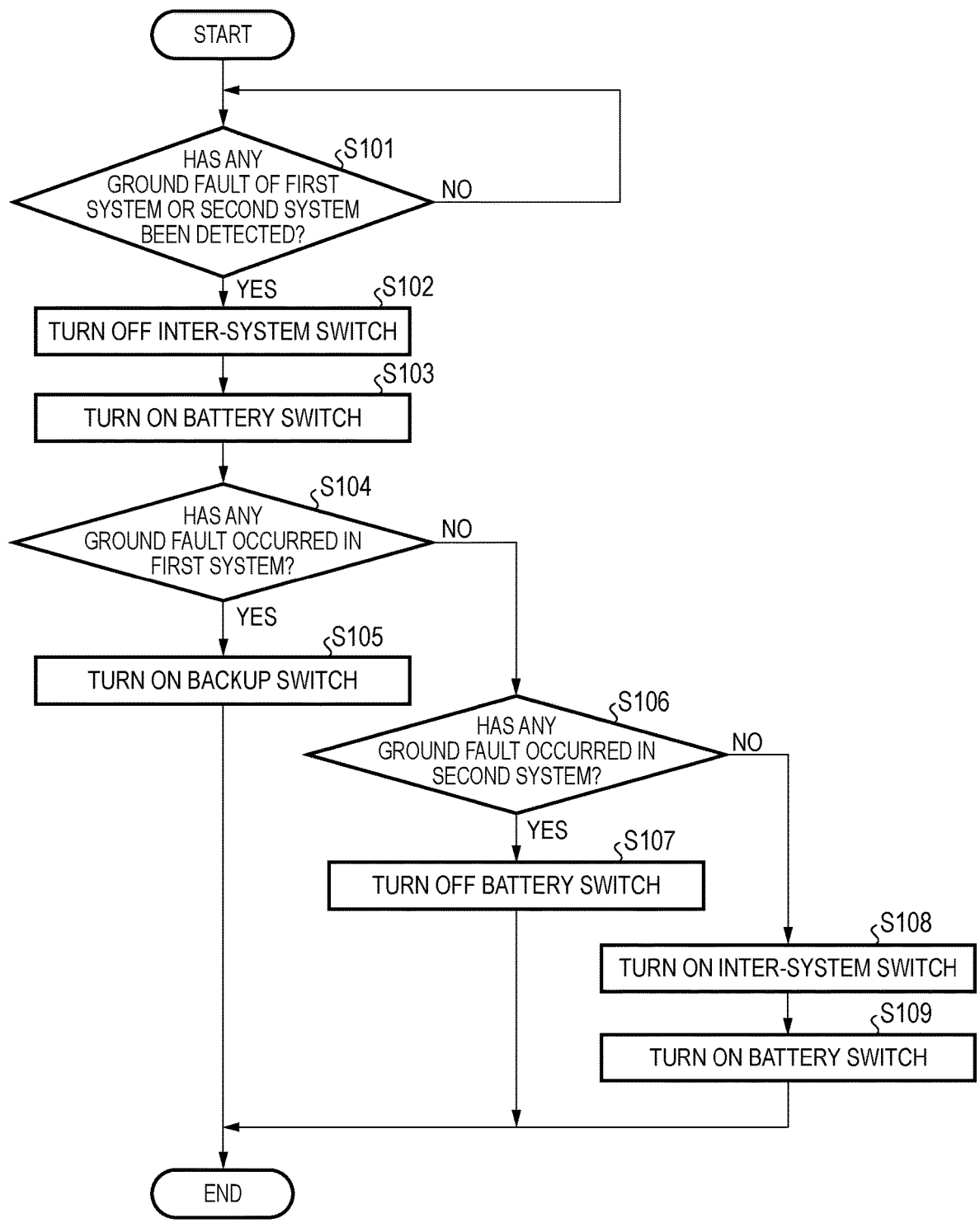
FIG. 6 is a flow chart illustrating an example of processing which is performed by a determining unit of the power supply device according to the first embodiment.

Now, an example of processing which is performed by the determining unit of the power supply device according to the first embodiment will be described with reference to FIG. 6. FIG. 6 is a flow chart illustrating the example of processing which is performed by the determining unit of the power supply device according to the first embodiment.

The determining unit 3 performs the processing shown in FIG. 6 during a normal operation in which the vehicle is active. As shown in FIG. 6, if the vehicle is activated, the determining unit 3 determines whether any ground fault of the first system 110 or the second system 120 has been detected, or not, first (STEP S101).

If determining that any ground fault of the first system 110 or the second system 120 has not been detected ("No" in STEP S101), the determining unit 3 repeats the determining process of STEP S101 until a ground fault is detected. Meanwhile, if determining that a ground fault of the first system 110 or the second system 120 has been detected ("Yes" in STEP S101), the determining unit 3 turns off the inter-system switch 41 (STEP S102), and turns on the battery switch 42 (STEP S103).

Subsequently, the determining unit 3 determines whether any ground fault has occurred in the first system 110 or not (STEP S104). If determining that a ground fault has occurred in the first system ("Yes" in STEP S104), the determining unit 3 determines that an abnormality has occurred in the first system 110, and turns on the backup switch 43 (STEP S105) to supply electric power from the second power supply 20 to the second load 103, and ends the processing.

Meanwhile, if determining that any ground fault has not occurred in the first system 110 ("No" in STEP S104), the determining unit 3 determines whether any ground fault has occurred in the second system 120 or not (STEP S106). If determining that a ground fault has occurred in the second system 120 ("Yes" in STEP S106), the determining unit 3 determines that an abnormality has occurred in the second system 120, and turns off the battery switch 42 (STEP S107) to prevent the electric discharge of the second power supply 20 and supply electric power from the first power supply 10 to the first load 101, and ends the processing.

Meanwhile, if determining that any ground fault has not occurred in the second system 120 ("No" in STEP S106), the determining unit 3 determines that it was a detection error caused by temporal overload, noise, and the like, and turns on the inter-system switch 41 (STEP S108), and then turns off the battery switch 42 (STEP S109), so as to restore the power supply device to the normal state. Further, since when restoring the power supply device to the normal state, the determining unit 3 turns on the inter-system switch 41, and then turns off the battery switch 42, it is possible to restore the power supply device to the normal state without interruption of electric power for the second load 103.

2. SECOND EMBODIMENT

2-1. Configuration of Power Supply Device

Figure 7:
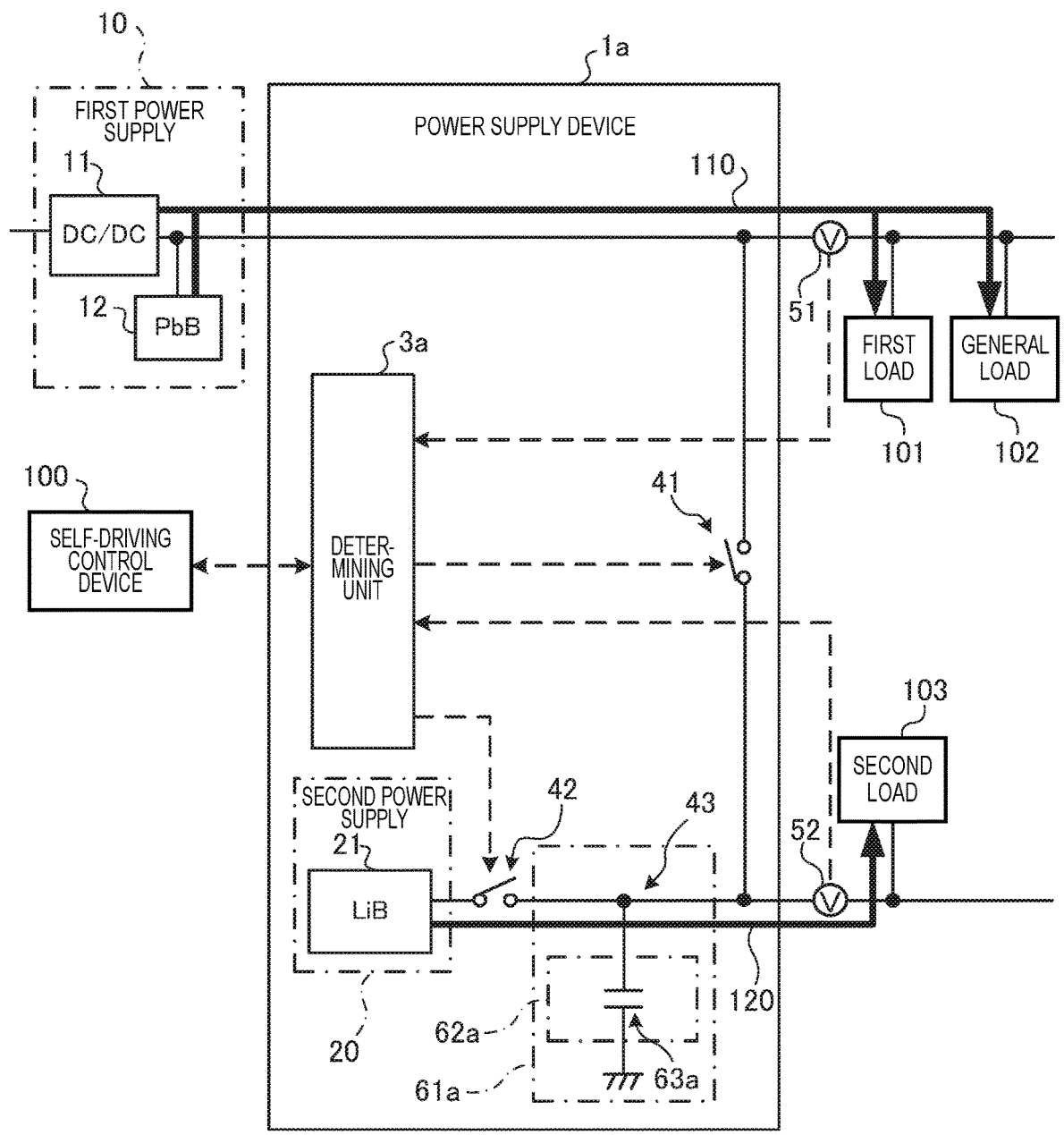
FIG. 7 is an explanatory view illustrating a configuration example of a power supply device according to a second embodiment.

Now, the configuration of a power supply device according to a second embodiment will be described with reference to FIG. 7. FIG. 7 is an explanatory view illustrating a configuration example of the power supply device according to the second embodiment. Hereinafter, of the components shown in FIG. 7, components identical to the components shown in FIG. 1 are denoted by the same reference symbols as the reference symbols shown in FIG. 1, to avoid a repetitive description thereof.

As shown in FIG. 7, a power supply device 1a according to the second embodiment is different from the power supply device 1 shown in FIG. 1 in that it includes a suppression circuit 61a in place of the suppression circuit 61 shown in FIG. 1 and in the control of a determining unit 3a on the battery switch 42.

The suppression circuit 61a includes an electric storage circuit 62a. For example, the electric storage circuit 62a is charged with electric power supplied from the first power supply 10, and supplies the stored electric power to the second system 120. The electric storage circuit 62a is, for example, a capacitor 63a.

If detecting a ground fault 200 of the first system 110 or the second system 120, the determining unit 3a turns off the inter-system switch 41. At this time, the battery switch 42 is in the OFF state. Therefore, if the inter-system switch 41 is turned off, the capacitor 63a is discharged, whereby electric power is supplied to the second system 120.

Therefore, the determining unit 3a can determine whether a ground fault has occurred in the second system 120 or not, using the electric power stored in the capacitor 63a, without using the electric power of the second power supply 20.

Now, the operation of the power supply device 1a will be described with reference to FIG. 8 to FIG. 11. In FIG. 8 to FIG. 11, in order to facilitate understanding of the operation of the power supply device 1a, the determining unit 3a, the self-driving control device 100, and the control signal lines shown by the dashed arrows in FIG. 7 are not shown.

2-2. NORMAL OPERATION OF POWER SUPPLY DEVICE

Figure 8:
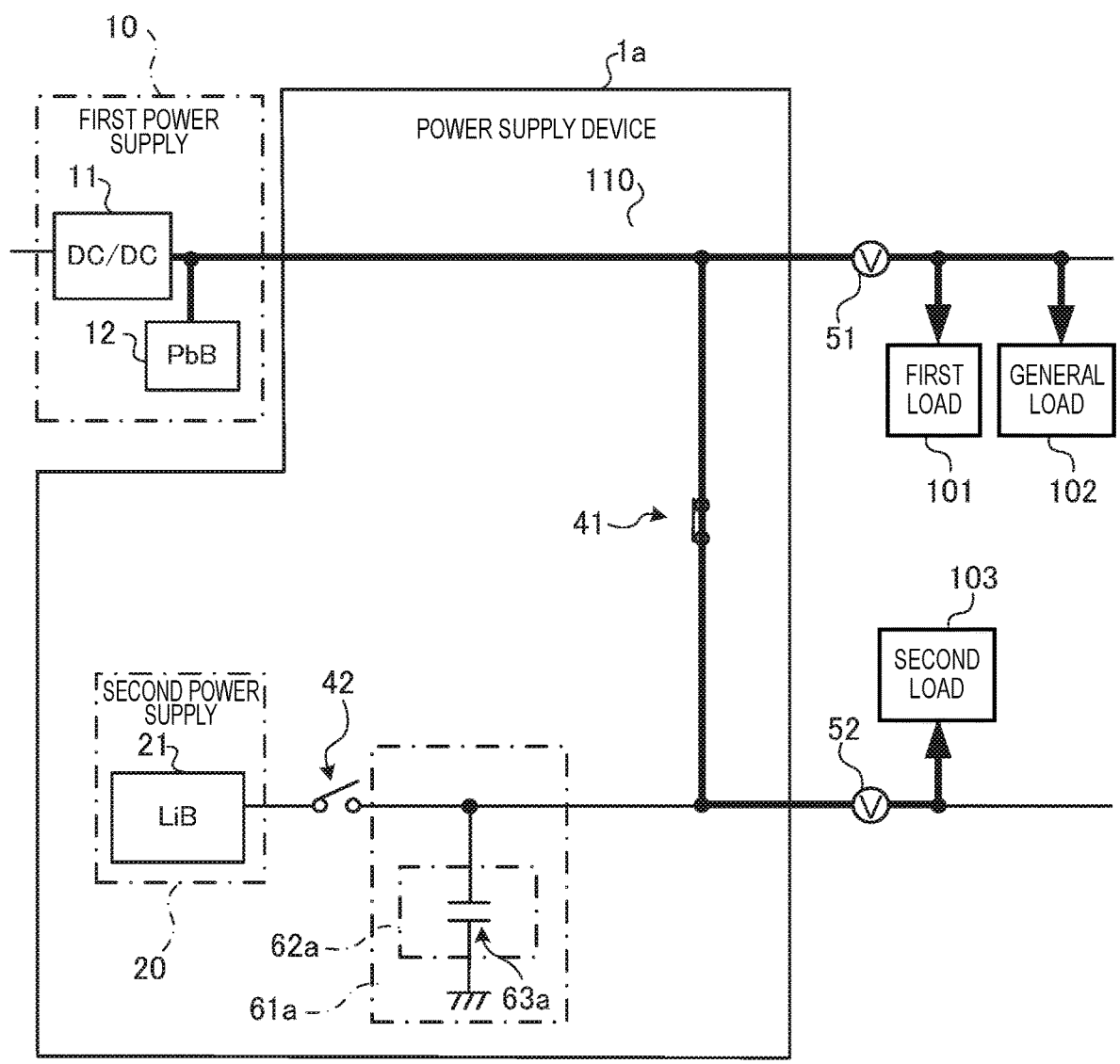
FIG. 8 is an explanatory view illustrating an operation example of the power supply device according to the second embodiment.

In normal time when there is no ground fault in the first system 110 and the second system 120, the determining unit 3a turns on the inter-system switch 41, and turns off the battery switch 42, as shown in FIG. 8, to supply electric power from the first power supply 10 to the first load 101, the general load 102, and the second load 103. At this time, the capacitor 63a is charged with the electric power supplied from the first power supply 10.

2-3. GROUND FAULT SYSTEM DETERMINING OPERATION OF POWER SUPPLY DEVICE

Figure 9:
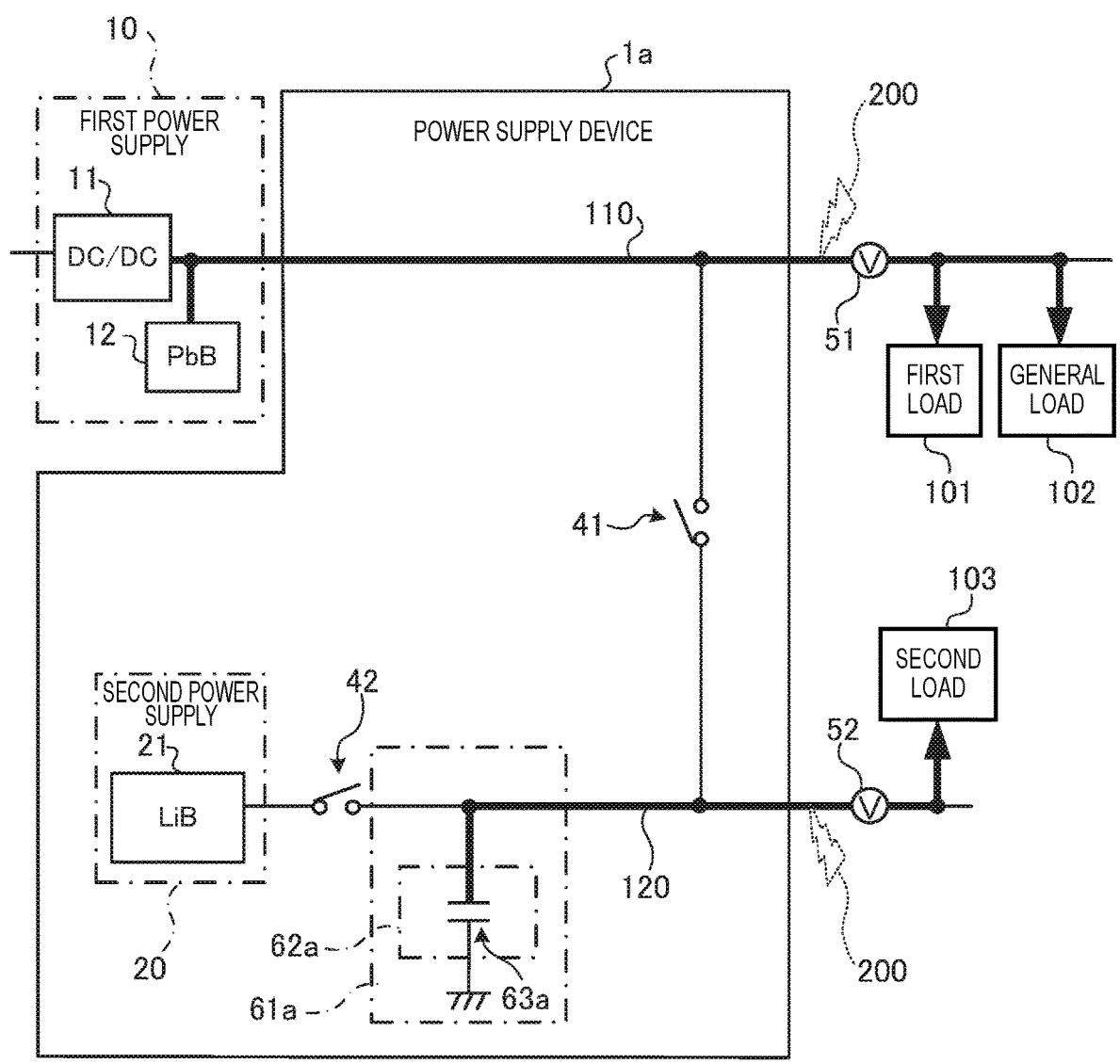
FIG. 9 is an explanatory view illustrating another operation example of the power supply device according to the second embodiment.

As shown in FIG. 9, similarly to the first embodiment, if at least one of the voltages which are detected by the voltage sensors 51 and 52 becomes equal to or lower than the ground fault threshold due to occurrence of a ground fault 200, the determining unit 3a of the power supply device 1a determines that a ground fault 200 has occurred in the first system 110 or the second system 120, and turns off the inter-system switch 41. Subsequently, the determining unit 3a determines which system of the first system 110 and the second system 120 the ground fault 200 has occurred in.

After the inter-system switch 41 is turned off, if the voltage which is detected by the voltage sensor 51 returns to the voltage higher than the ground fault threshold within the predetermined time T, the determining unit 3a determines that there is no ground fault 200 in the first system 110. Further, if the voltage which is detected by the voltage sensor 51 is equal to or lower than the ground fault threshold continuously for the predetermined time T, the determining unit 3a determines that there is a ground fault 200 in the first system 110, and determines that an abnormality has occurred in the first system 110.

Furthermore, in the power supply device 1a, if the inter-system switch 41 is turned off, the capacitor 63a is discharged, whereby electric power for ground fault detection is supplied to the second system 120. At this time, the battery switch 42 is in the OFF state, so the second power supply 20 is not discharged.

If the voltage which is detected by the voltage sensor 52 returns to the voltage higher than the ground fault threshold within the predetermined time T due to the electric power which is supplied from the capacitor 63a to the second system 120, the determining unit 3a determines that there is no ground fault 200 in the second system 120. Further, if the voltage which is detected by the voltage sensor 52 is equal to or lower than the ground fault threshold continuously for the predetermined time T, the determining unit 3a determines that there is a ground fault 200 in the second system 120, and determines that an abnormality has occurred in the second system 120.

As described above, if detecting a ground fault of the first system 110 or the second system 120, the power supply device 1a supplies the electric power for ground fault detection output from the capacitor 63a disconnected from the second power supply 20 to the second system 120, to determine whether there is a ground fault 200 in the second system 120 or not. Therefore, the power supply device 1a can determine whether a ground fault is a ground fault 200 of the second system 120 or not, by making the amount of electric discharge of the second power supply 20 to zero.

2-4. OPERATION OF POWER SUPPLY DEVICE DURING FIRST-SYSTEM GROUND FAULT

Figure 10:
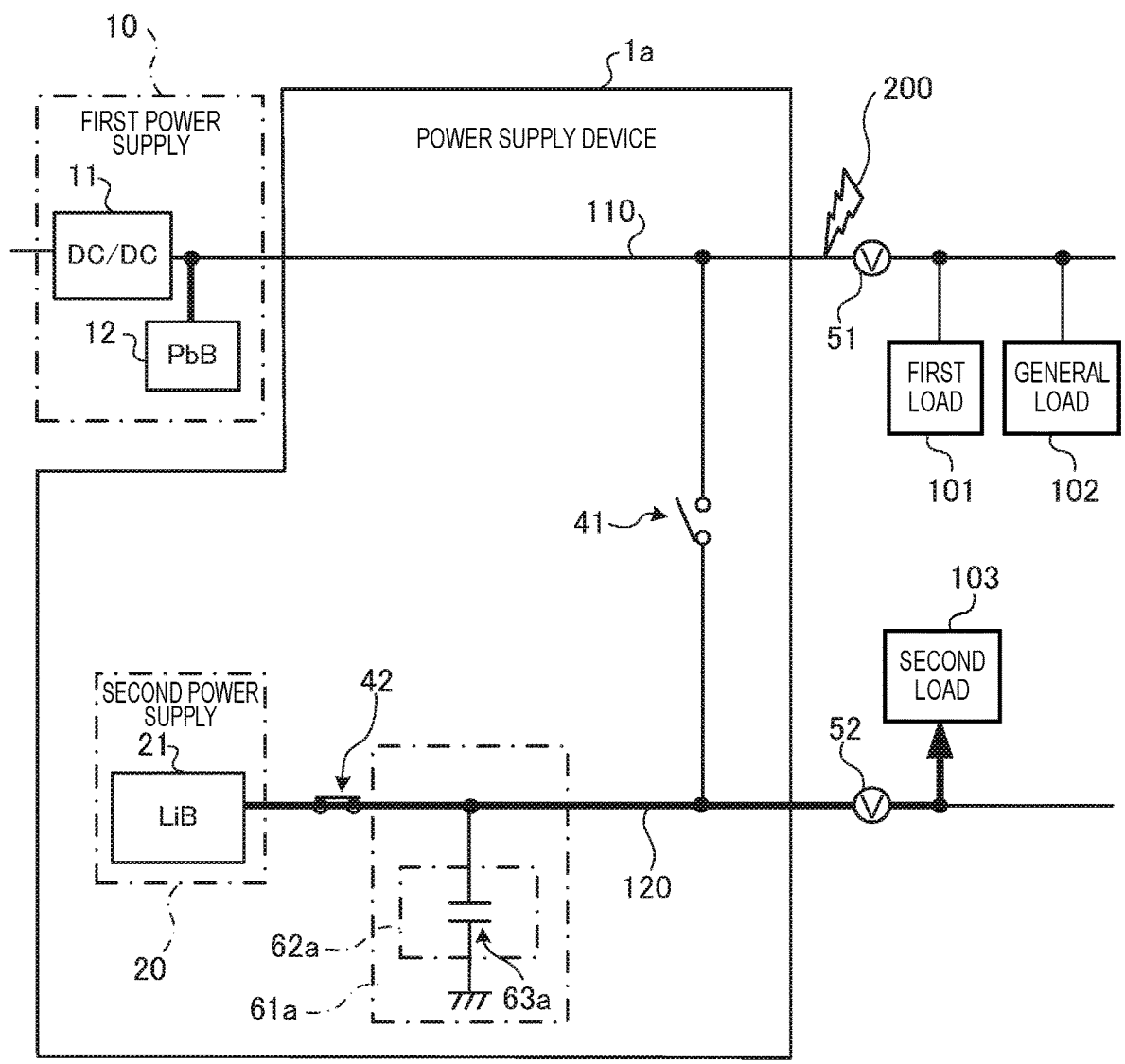
FIG. 10 is an explanatory view illustrating a further operation example of the power supply device according to the second embodiment.

Now, the operation of the power supply device 1a during first-system ground fault will be described with reference to FIG. 10. As shown in FIG. 10, if detecting and determining a ground fault 200 of the first system 110, the determining unit 3a turns on the battery switch 42 from the state shown in FIG. 9. As a result, the power supply device 1a supplies electric power from the second power supply 20 to the second load 103, such that the second load 103 can make the vehicle run for evacuation.

2-5. OPERATION OF POWER SUPPLY DEVICE DURING SECOND-SYSTEM GROUND FAULT

Figure 11:
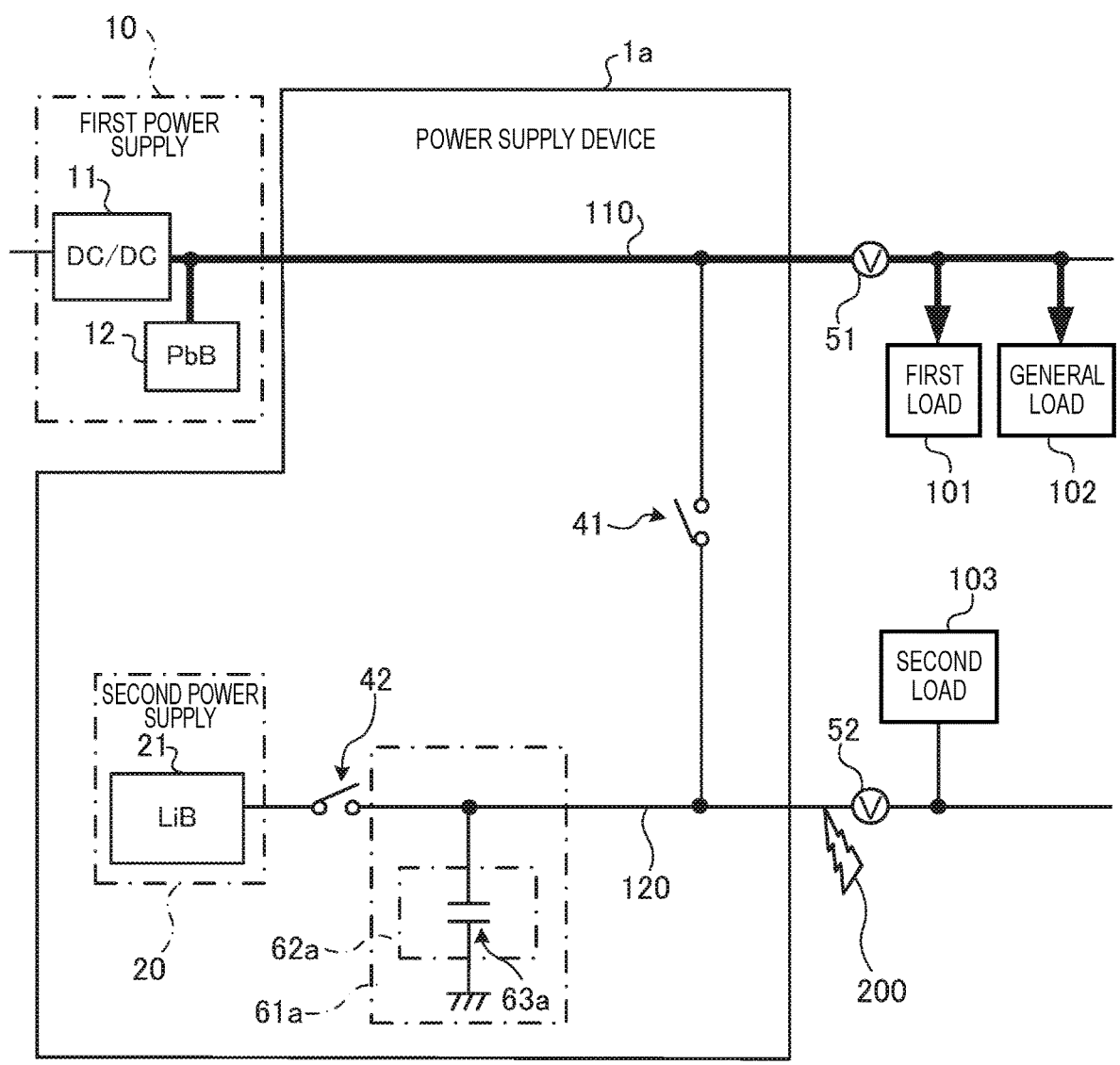
FIG. 11 is an explanatory view illustrating a still further operation example of the power supply device according to the second embodiment.

Now, the operation of the power supply device 1a during second-system ground fault will be described with reference to FIG. 11. As shown in FIG. 11, if detecting and determining a ground fault 200 of the second system 120, the determining unit 3a supplies electric power from the first power supply 10 to the first load 101 while keeping the battery switch 42 in the OFF state, such that first load 101 can make the vehicle run for evacuation.

If determining that any ground fault has not occurred in either of the first system 110 and the second system 120, the determining unit 3a determines that it was a detection error caused by temporal overload, noise, or the like attributable to the first load 101, the second load 103, and so on, and turns on the inter-system switch 41, thereby restoring the power supply device to the normal state.

2-6. PROCESSING WHICH IS PERFORMED BY DETERMINING UNIT OF POWER SUPPLY DEVICE

Figure 12:
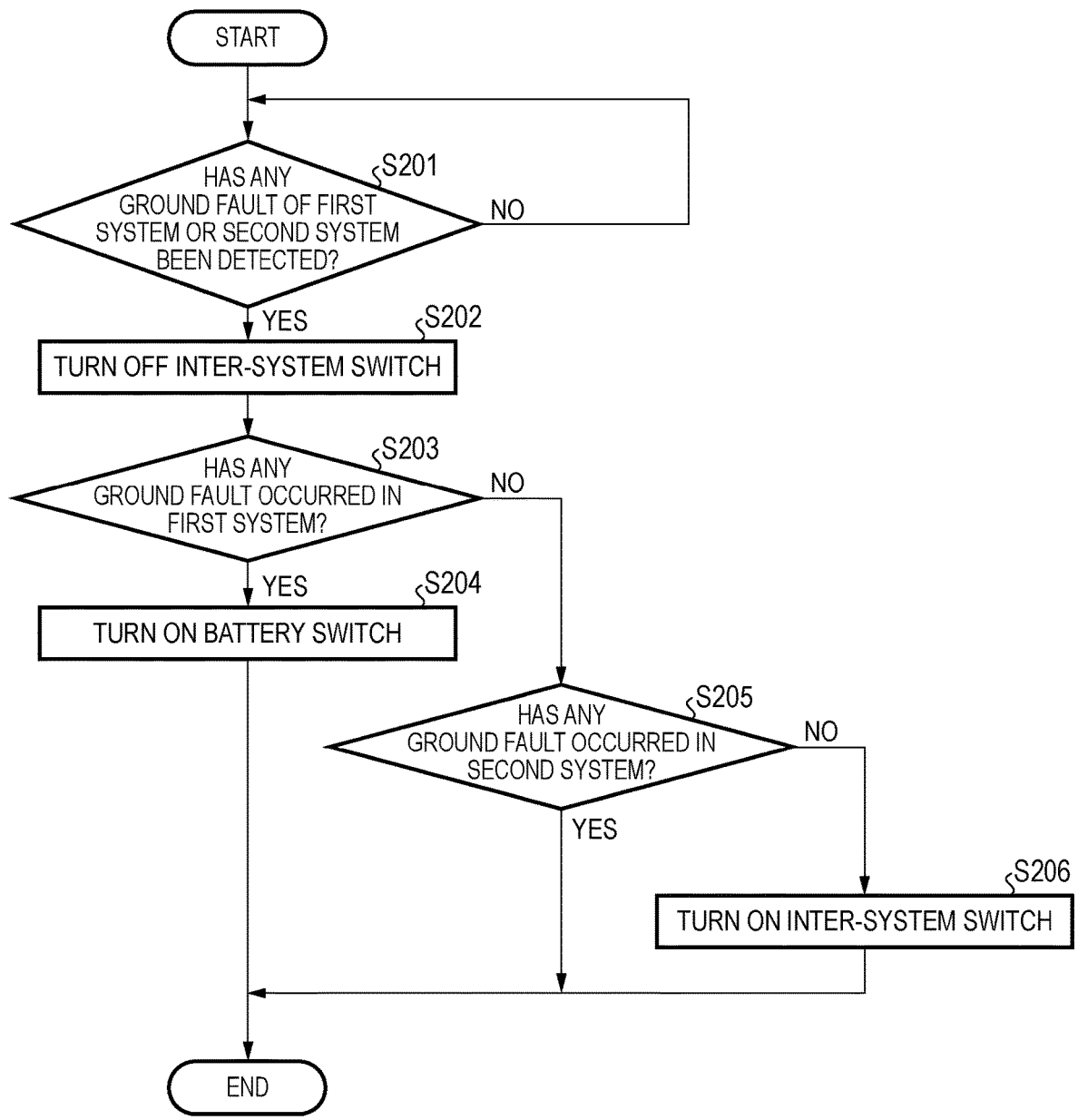
FIG. 12 is a flow chart illustrating an example of processing which is performed by a determining unit of the power supply device according to the second embodiment.

Now, an example of processing which is performed by the determining unit of the power supply device according to the second embodiment will be described with reference to FIG. 12. FIG. 12 is a flow chart illustrating the example of processing which is performed by the determining unit of the power supply device according to the second embodiment.

The determining unit 3a performs the processing shown in FIG. 12 during a normal operation in which the vehicle is active. As shown in FIG. 12, if the vehicle is activated, the determining unit 3a determines whether any ground fault of the first system 110 or the second system 120 has been detected or not, first (STEP S201).

If determining that any ground fault of the first system 110 or the second system 120 has not been detected ("No" in STEP S201), the determining unit 3a repeats the determining process of STEP S201 until a ground fault is detected. Meanwhile, if determining that a ground fault of the first system 110 or the second system 120 has been detected ("Yes" in STEP S201), the determining unit 3a turns off the inter-system switch 41 (STEP S202), and determines whether any ground fault has occurred in the first system 110 or not (STEP S203).

If determining that a ground fault has occurred in the first system 110 ("Yes" in STEP S203), the determining unit 3a turns on the battery switch 42 (STEP S204) to supply electric power from the second power supply 20 to the second load 103, and ends the processing. Meanwhile, if determining that any ground fault has not occurred in the first system 110 ("No" in STEP S203), the determining unit 3 determines whether any ground fault has occurred in the second system 120 or not (STEP S205).

If determining that a ground fault has occurred in the second system 120 ("Yes" in STEP S205), the determining unit 3a determines that an abnormality has occurred in the second system 120, and supplies electric power from the first power supply 10 to the first load 101, and ends the processing. At this time, the battery switch 42 is in the OFF state, so the second power supply 20 is not discharged.

Meanwhile, if determining that any ground fault has not occurred in the second system 120 ("No" in STEP S205), the determining unit 3a determines that it was a detection error caused by temporal overload, noise, and the like, and turns on the inter-system switch 41 (STEP S206), so as to restore the power supply device to the normal state.

Various advantages and modifications can be easily achieved by those skilled in the art. Therefore, the invention in its broader aspects is not limited to the specific details and representative embodiments shown and described above. Accordingly, various modifications may be made without departing from the spirit or scope of the general inventive concept as defined by the appended claims and their equivalents.

DESCRIPTION OF REFERENCE NUMERALS 1, 1a Power Supply Device
10 First Power Supply
11 DC/DC
12 PbB
20 Second Power Supply
21 LiB
3, 3a Determining Unit
41 Inter-System Switch
42 Battery Switch
43 Backup Switch
51, 52 Voltage Sensor
61, 61a Suppression Circuit
62 Current Limiting Circuit
62a Electric Storage Circuit
63 Resistor
63a Capacitor
100 Self-Driving Control Device
101 First Load
102 General Load
103 Second Load
110 First System
120 Second System

What is claimed is:

1. A power supply device comprising:
  a first system configured to supply electric power of a first power supply to a first load;
  a second system configured to supply electric power of a second power supply to a second load;
  an inter system switch configured to be able to connect and disconnect between the first system and the second system;
  a determining unit configured to keep the inter system switch in an ON state in a normal operation so that the electric power of the first power supply is supplied to both the first load and the second load, and in response to detecting a ground fault of the first system or the second system during the normal operation, turn OFF the inter system switch and determine, after the turning OFF, which of the first and second systems the ground fault has occurred in; and
  a suppression circuit configured to, after the turning OFF of the inter system switch, simultaneously perform (i) suppressing of an electric discharge of the second power supply and (ii) supplying of electric power for ground fault detection to the second system,
  wherein the determining unit determines, after the turning OFF of the inter system switch, whether or not any ground fault has occurred in the second system based on the electric power which is supplied from the suppression circuit to the second system.

2. The power supply device according to claim 1, further comprising:
  a battery switch configured to be able to connect and disconnect between the second power supply and the second system, wherein
  the suppression circuit comprises a current limiting circuit configured to limit electric current output from the second power supply and supply the electric power for the ground fault detection to the second system, and
  when detecting the ground fault of the first system or the second system, the determining unit turns on the battery switch, and determines whether or not any ground fault has occurred in the second system based on the electric power which is supplied from the current limiting circuit to the second system.

3. The power supply device according to claim 1, further comprising:
a battery switch configured to be able to connect and disconnect between the second power supply and the second system, wherein
the suppression circuit comprises an electric storage circuit configured to supply electric power stored in the electric storage circuit to the second system, and
when detecting the ground fault of the first system or the second system, the determining unit turns OFF the battery switch, and determines whether or not any ground fault has occurred in the second system based on the electric power which is supplied from the electric storage circuit to the second system.

4. A determining method comprising:
causing a determining unit of a power supply device including a first system configured to supply electric power of a first power supply to a first load, a second system configured to supply electric power of a second power supply to a second load, and an inter system switch configured to be able to connect and disconnect between the first system and the second system to keep the inter system switch in an ON state in a normal operation so that the electric power of the first power supply is supplied to both the first load and the second load, and in response to detecting a ground fault of the first system or the second system during the normal operation, turn OFF the inter system switch and determine, after the turning OFF, which of the first and second systems the ground fault has occurred in,
after the turning OFF of the inter-system switch, causing a suppression circuit of the power supply device to simultaneously (i) suppress an electric discharge of the second power supply and (ii) supply electric power for ground fault detection to the second system, and
after the turning OFF of the inter-system switch, causing the determining unit of the power supply device to determine whether or not any ground fault has occurred in the second system based on the electric power which is supplied from the suppression circuit to the second system.

5. The power supply device according to claim 1, wherein the suppression circuit is further configured not to suppress the electric discharge of the second power supply when the determining unit determines that no ground fault has occurred in the second system and that the ground fault has occurred in the first system.

6. The power supply device according to claim 2, wherein
a resistor is provided in the current limiting circuit,
a backup switch is provided in the suppression circuit so that the resistor in the current limiting circuit and the backup switch are connected in parallel,
when detecting the ground fault of the first system or the second system, the determining unit turns on the battery switch, and determines whether or not any ground fault has occurred in the second system based on the electric power which is supplied from the current limiting circuit including the resistor to the second system under a condition where the backup switch is in an OFF state, and
when the determining unit determines that no ground fault has occurred in the second system and that the ground fault has occurred in the first system, the determining unit turns on the backup switch so that the power supply device supplies the electric power from the second power supply to the second load through the battery switch and the backup switch.

7. The power supply device according to claim 3, wherein
a capacitor is provided in the electric storage circuit, and
when the determining unit determines that no ground fault has occurred in the second system and that the ground fault has occurred in the first system, the determining unit turns on the battery switch so that the power supply device supplies the electric power from the second power supply to the second load.

8. The method according to claim 4, wherein:
a battery switch is provided and is configured to be able to connect and disconnect between the second power supply and the second system,
the suppression circuit comprises a current limiting circuit configured to limit electric current output from the second power supply and supply the electric power for the ground fault detection to the second system, and
when detecting the ground fault of the first system or the second system, the determining unit turns ON the battery switch, and determines whether or not any ground fault has occurred in the second system based on the electric power which is supplied from the current limiting circuit to the second system.

9. The method according to claim 4, wherein
a battery switch is provided and is configured to be able to connect and disconnect between the second power supply and the second system,
the suppression circuit comprises an electric storage circuit configured to supply electric power stored in the electric storage circuit to the second system, and
when detecting the ground fault of the first system or the second system, the determining unit turns OFF the battery switch, and determines whether or not any ground fault has occurred in the second system based on the electric power which is supplied from the electric storage circuit to the second system.

10. The method according to claim 4, further comprising:
causing the suppression circuit not to suppress the electric discharge of the second power supply when the determining unit determines that no ground fault has occurred in the second system and that the ground fault has occurred in the first system.

11. The method according to claim 8, wherein
a resistor is provided in the current limiting circuit,
a backup switch is provided in the suppression circuit so that the resistor in the current limiting circuit and the backup switch are connected in parallel,
when detecting the ground fault of the first system or the second system, the determining unit turns on the battery switch, and determines whether or not any ground fault has occurred in the second system based on the electric power which is supplied from the current limiting circuit including the resistor to the second system under a condition where the backup switch is in an OFF state, and
when the determining unit determines that no ground fault has occurred in the second system and that the ground fault has occurred in the first system, the determining unit turns on the backup switch so that the power supply device supplies the electric power from the second power supply to the second load through the battery switch and the backup switch.

12. The method according to claim 9, wherein
a capacitor is provided in the electric storage circuit, and when the determining unit determines that no ground fault has occurred in the second system and that the ground fault has occurred in the first system, the determining unit turns on the battery switch so that the power supply device supplies the electric power from the second power supply to the second load.

* * * * *